3,184,488
PREPARATION OF NOVEL 3-LOWER ALKOXY-17-HYDROXY - ALKOXYESTRA - 1,3,5(10) - TRIENE METHANESULFONATES
Gerhard R. Wendt, Havertown, and Kurt W. Ledig, Philadelphia, Pa., assignors to American Home Products Corporation, New York, N.Y., a corporation of Delaware
No Drawing. Filed Nov. 1, 1963, Ser. No. 320,836
3 Claims. (Cl. 260—397.5)

The present invention relates to a new class of methanesulfonates of 17-hydroxyalkoxy steroids useful as intermediates in the preparation of steroidal anti-lipemic agents such as the compound 17β-(2-dimethylaminoethoxy)-3-methoxyestra-1,3,5(10)-triene. The invention provides further means for the manufacture of these novel compositions and methods for their use in synthetic steroid chemistry.

A primary object of our invention therefore may be stated to be to disclose the concept and concrete embodiments of 17β-(hydroxyalkoxy)-3-lower alkoxyestra-1,3,5(10)-triene, methanesulfonates and simple derivatives thereof which may be illustrated at least in part by the general Formula I:

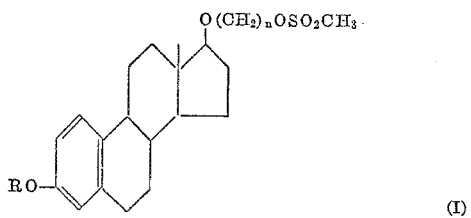

(I)

wherein $n$ represents the integer either 2 or 3 as the case may be and R represents a lower alkyl group. As an additional object the invention also proposes methods for the preparation and therapeutic use of these compounds as cholesterol shifting agents.

The symbol R in the above graphic representation of the composition aspect of our invention is intended to designate various lower alkyl groups some of which may be cycloalkyl as well as aliphatic straight chain functional groups. The lower alkyl groups methyl and ethyl are the preferred species in most instances but equivalently such other groups as propyl, butyl, isobutyl as well as the cycloalkyls, cyclopentyl, cyclohexyl, etc. and the like containing up to about 8 carbon atoms therein are also quite satisfactory in the compounds.

The invention sought to be patented in its composition aspect therefore may be described as residing in the concept and manifestations of a new steroidal compound having a 17-mesylalkoxy substitution in a 1,3,5(10)-estratriene nucleus and in its preferred product aspects a 3-methoxy side chain attached thereto. A particularly novel and useful characteristic of such a series of compounds is the substituent present in position 17 of the nucleus. By means of the methanesulfonyl (mesyl) group it should be recognized that various amino groups may be introduced into the molecule at position 17 by treatment of an appropraite compound of this invention with an amine.

A typical preparation of one of the compounds of our invention involves the reaction between a quantity of a substance such as d-17β-(2-hydroxyethoxy)-3-methoxyestra-1,3,5(10)-triene and mesyl chloride in an acetone-Dry Ice bath. The reaction mixture is held overnight at room temperature to insure completion of the reaction. Addition of water results in the formation of the crude product which is purified by conventional techniques to give a refined product. The compounds of this invention such as for instance the typical one d-17β-(2-hydroxyethoxy) - 3-methoxyestra-1,3,5(10)-triene, methane sulfonate may be reacted with a suitable amine such as diethylamine for as brief a period as six hours if increased temperature is employed at approximately 100° for example. The crude reaction product obtained may be further purified to yield the active cholesterol shifting agent d-17β-(2-diethylaminoethxoy) - 3 - methoxyestra-1,3,5(10)-triene.

As regards our novel starting steroidal 17-ethers they are not intended to be included as part of the invention claimed herein but are disclosed and claimed in our earlier filed copending application S.N. 310,485, filed September 20, 1963.

The manner of utilizing the invention sought to be patented will now be briefly described particularly as it relates to the employment in pharmacology of the physical embodiments resulting from the methods of preparation generally indicated above.

At the moment there is and has long been a desire in medicine to make available to the profession agents capable of reducing the incidence of atherosclerosis. Since a high cholesterol level in the blood of the animal has long been held to bear a causal relation to such a medical condition a continuing search for compounds capable of lowering the cholesterol level of mammals, particularly man, has existed. In the use aspect of the present invention the novel compounds of our invention have been found to demonstrate a capability to shift cholesterol from the blood of mammals. For example, the compound d - 17β-(2-dimethylaminoethoxy)-3-methoxyestra-1,3,5(10)-triene has been found to be an effective agent in shifting cholesterol from the blood of laboratory animals (rats) when administered at dosage of 20 mg./kg. or greater, while is precursor 17β-(2-hydroxyethoxy)-3-methoxyestra-1,3,5(10)-triene, methanesulfonate is also an active blood cholesterol lowering agent.

Besides having capacity to regulate blood lipids, the compounds of the invention are useful for their general hormonal effect particupIraly in the female and would therefore be expected to exhibit mild activity in those areas where natural estrogens are employed. When utilized as lipid shifting agents the effective dosage of the compound of this invention will depend upon the severity and the individual characteristics of each case wherein they are employed and specific dosage will of course, be determined by the attending physician or veterinarian. Generally a broad dosage range of from about 1.25 to about 40.0 mg. per kg. of body weight per day would constitute the overall range, for administration of a preferred compound of our invention such as 17β-(2-hydroxyethoxy)-3-methoxyestra-1,3,5(10)-triene, methanesulfonate.

The novel compounds of our invention in their concrete embodiment form may be administered in a number of ways i.e. either orally, intravenously, or intramuscularly. When contemplated for use in pharmaceutical products they, of course, can be administered singly or in combination with other active or inert ingredients in dosage unit form. If desired, they may be combined with a large number of compatible diluents, carriers, binders, and excipients to form a pharmaceutical preparation. Such typical liquid carriers as water, mineral oil, or a nontoxic alcohol may be admixed where prepartion suitable for injection are to be the form of administration. Carboxymethylcellulose, starches, various sugars and the like may be employed where tablets or powders are to be compounded as a vehicle for oral administration.

The invention in its concrete embodiment aspects as well as the general concept of the compounds and processes involved in our invention will be illustrated by the following several examples. It is, of course, to be understood that the general nature of our invention is intended to include these compositions, uses, compounds, and processes which would in the scientific opinion of the inventors be considered as substantial equivalents to the embodiments described in the hereinafter typical illustrations.

EXAMPLE I

*d-17β-(2-hydroxyethoxy)-3-methoxyestra-1,3,5(10)-triene, methanesulfonate*

A solution of 4.0 g. of d-17β-(2-hydroxyethoxy)-3-methoxyestra-1,3,5(10)-triene in 30 ml. of pyridine is cooled in an acetone Dry Ice bath. While stirring, 1.64 ml. of mesyl chloride is added dropwise at that temperature and the reaction mixture left standing overnight at room temperature. Addition of water results in a precipitate which is filtered off and crystallized from methanol to give 3.5 g. of crude product. A 500 mg. sample is recrystallized from methanol giving 400 mg. of d-17β-(2-hydroxyethoxy) - 3 - methoxyestra-1,3,5(10) - triene, methanesulfonate, M.P. 131–132°; I.R. no OH. (Found: C, 64.62; H, 7.79; S, 7.73. $C_{22}H_{32}O_5S$ requires C, 64.69; H, 7.90; S, 7.85%.)

EXAMPLE II

*d-17β-(2-hydroxyethoxy)-3-butoxyestra-1,3,5(10)-triene, methanesulfonate*

Substituting d-17β-(2-hydroxyethoxy)-3-methoxyestra-1,3,5(10)-triene as the starting material with d-17β-(2-hydroxyethoxy)-3-butoxyestra-1,3,5(10)-triene and proceeding as described in Example I, d-17β-(2-hydroxyethoxy)-3-butoxyestra-1,3,5(10)-triene, methanesulfonate is obtained.

EXAMPLE III

*d-17β-(2-hydroxyethoxy)-3-cyclopentyloxyestra-1,3,5(10)-triene, methanesulfonate*

Substituting a d-17β-(2-hydroxyethoxy) - 3 - methoxyestra-1,3,5(10)-triene as the starting material with 17β-(2-hydroxyethoxy) - 3 - cyclopentyloxyestra-1,3,5(10)-triene, d-17β-(2-hydroxyethoxy)-3 - cyclopentyloxyestra-1,3,5(10)-triene, methanesulfonate is obtained.

We claim:
1. A compound having the formula:

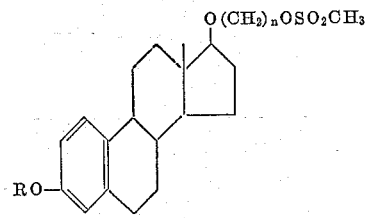

wherein R represents a lower alkyl group and $n$ is from 2 to 3.

2. A compound having the formula:

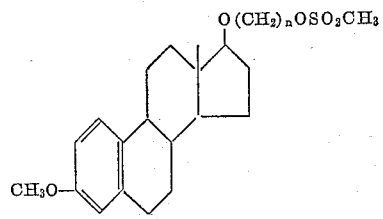

wherein $n$ is from 2 to 3.

3. 17β - (2-hydroxyethoxy)-3-methoxyestra-1,3,5(10)-triene, methanesulfonate.

References Cited by the Examiner
UNITED STATES PATENTS
2,903,449   9/59   Fried et al. _____ 260—307.5

LEWIS GOTTS, *Primary Examiner.*